United States Patent [19]

Bullen

[11] Patent Number: 5,025,071
[45] Date of Patent: Jun. 18, 1991

[54] CROSSLINKABLE SILYL POLYMER COMPOSITION

[75] Inventor: David J. Bullen, Hackettstown, N.J.

[73] Assignee: BP Chemicals Limited, London, England

[21] Appl. No.: 375,819

[22] Filed: Jul. 5, 1989

[30] Foreign Application Priority Data

Jul. 13, 1988 [GB] United Kingdom ................. 8816657

[51] Int. Cl.$^5$ ................................................ C08F 8/00
[52] U.S. Cl. ................................... 525/326.5; 525/386
[58] Field of Search ............................. 525/326.5, 386

[56] References Cited

U.S. PATENT DOCUMENTS 4,826,904 5/1989 Matsumura et al. ............. 525/326.5

Primary Examiner—Bernard Lipman
Attorney, Agent, or Firm—Brooks, Haidt, Haffner & Delahunty

[57] ABSTRACT

The inclusion of an ester of a linear dibasic acid having from 4 to 14 carbon atoms and a branched alcohol having from 4 to 14 carbon atoms in a composition comprising a silyl polymer and an organometallic silanol condensation catalyst, increases the tendency of the composition to crosslink under ambient conditions. The invention includes compositions crosslinkable by the action of water comprising a silyl polymer, a dicarboxylic acid ester and an organometallic silanol condensation catalyst and also processes for the preparation of the compositions.

8 Claims, No Drawings

CROSSLINKABLE SILYL POLYMER COMPOSITION

The present invention relates to crosslinkable organic polymer compositions. More particularly the present invention is concerned with crosslinkable compositions comprising organic polymers containing hydrolysable silane groups, which polymers can be thermoformed into shaped articles, for example cable insulation or pipe, and subsequently crosslinked by contacting the articles with water or steam in the presence of a so-called "silanol condensation catalyst".

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers, for example, ethylenically unsaturated or vinyl monomers, with unsaturated silane compounds containing hydrolysable groups. Examples of this method are described in GB-A-2028831 and GB-A-2039513 which discloses the preparation of crosslinkable copolymers of ethylene and an ethylenically unsaturated silane compound by copolymerising the monomers at relatively high temperatures and pressures in the presence of a free radical polymerisation initiator. Another example of this copolymerisation method is described in GB-A-1415194 which discloses the preparation of crosslinkable copolymer by contacting ethylene and a terminally unsaturated silane compound, optionally with other olefinically unsaturated comonomer, with certain defined Ziegler catalysts under polymerisation conditions which preferably employ relatively low temperatures and pressures.

It is also known that polymers crosslinkable by the action of water and a silanol condensation catalyst can be prepared by grafting an unsaturated silane compound on to a preferred polymeric material. Grafting processes of this type can be carried out by heating together a base polymer, for example polyethylene, an unsaturated silane compound bearing one or more hydrolysable groups, a grafting initiator and optionally a silanol condensation catalyst, under conditions such that the unsaturated silane compound is grafted on to the base polymer. Examples of this method are disclosed in GB-A-1357549, GB-A-1234034 and GB-A-1286460. Examples of commercial processes which employ a grafting reaction of this type are the SIOPLAS and the MONOSIL processes. (SIOPLAS and MONOSIL are registered trade marks). In the SIOPLAS process, the base polymer is heated with the unsaturated silane in the presence of a grafting initiator and the product is extruded and pelleted to produce a pelleted silane-grafted thermoplastic polymer. The pelleted polymer can then be fed with a silanol condensation catalyst to a thermoforming process for fabricating shaped products. These shaped products are then crosslinked by exposure to water or steam. In the MONOSIL process, the base polymer, the unsaturated silane, the grafting initiator and the silanol condensation catalyst are fed simultaneously to a special extruder in which grafting occurs "in situ" and crosslinkable products, e.g. cable or pipe, are directly extruded. These products can be crosslinked by exposure to steam or water under the influence of the silanol condensation catalyst.

Other known methods for forming polymeric materials having hydrolysable silane groups include "transesterification" methods wherein a copolymer having exchangeable functions such as alkoxy groups (as, for example, in ethylene/ethyl acrylate copolymer) or carboxylate groups (as, for example, in ethylene/vinyl acetate copolymer) is treated with a suitable silane compound in the presence of a special ester-exchange catalyst.

For example, European patent application 4752 discloses a method for the production of water-curable silane-modified alkylene-alkyl acrylate copolymers which comprises reacting an alkylene alkylacrylate, copolymer, e.g. ethylene ethyl acrylate, with a silane in the presence of an organotitanate catalyst, e.g. titanium tetraisopropylate. Examples of suitable silane compounds are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. In another example of the transesterification method ethylene/vinyl acetate copolymer can be reacted with a suitable silane compound bearing hydrolysable groups and having esterified carboxylic acid groups which exchange with the acetate groups on the copolymer. A suitable silane compound is 4-[tri(m)ethoxysilyl] butanoic acid (m)ethyl ester.

Polysiloxane-modified copolymers prepared by reacting a mixture containing an alkylene-alkyl acrylate copolymer and a polysiloxane in the presence of an organo titanate catalyst are also known. For example, European Patent No. 49 155 discloses the production of such polysiloxane-modified copolymers and European patent application EP 120 115 discloses compositions comprising a polysiloxane and an organo titanate and the use thereof in the production of such polysiloxane-modified alkylene-alkyl acrylate copolymers.

Although the polysiloxane-modified alkylene-alkylacrylate copolymers are water-curable, they have a very different molecular structure to those polymers prepared using monomeric silanes. According to European Patent No. 49 155, the advantage of using a polysiloxane is that the polysiloxane-modified alkylene-alkyl acrylate copolymers produced and free of undesirable volatiles.

The present invention relates to crosslinkable organic polymers having pendant, hydrolysable silane groups which are not derived from a polysiloxane. These polymers, which are hereinafter referred to as "silyl polymers" can be prepared, as described above, by copolymerising unsaturated organic monomers with unsaturated silane compounds containing hydrolysable groups, by grafting an unsaturated silane compound on to a preformed polymeric material or by the transesterification methods using a monomeric silane, e.g. as disclosed in European patent application 4752. The silyl polymers can be fabricated to form a large variety of useful articles by conventional techniques, for example, extrusion, injection moulding, blow-moulding and film-blowing processes.

The crosslinking step is generally carried out subsequent to fabrication of the article because the crosslinked polymer cannot in general be satisfactorily thermoformed. For example, reels or drums of wire or cable which has been extrusion-coated with a silyl polymer containing a silanol condensation catalyst are usually exposed to moisture at elevated temperature to effect crosslinking of the silyl polymer. The exposure can take the form of immersion in a tank of hot water at about 80° C. or exposure to low pressure steam at about 100° C. in an enclosure commonly termed a "sauna". The length of time required to crosslink the silyl polymer to the extent that it will comply with the requirements of the appropriate specification depends on the time needed to raise the temperature of the wire or cable and the thickness of the silyl polymer coating. Typically, a reel containing 2 km of 25 mm$^2$ cable insulated with a 1.5 mm thick layer of silyl polymer will have to be treated for about 8 hours to achieve the desired degree of crosslinking using these techniques.

Silyl polymers containing a silanol condensation catalyst will gradually crosslink under ambient storage conditions due to the effect of atmospheric moisture permeating the silyl polymer. A reel containing 2 km of 25 mm$^2$ cable insulated with 1.5 mm of silyl polymer would crosslink to an adequate degree in 10 to 14 days under conditions of ambient temperature and humidity.

It has now been found that the inclusion in the crosslinkable composition of certain dicarboxylic acid esters increases the tendency of the composition to crosslink under ambient conditions of temperature, pressure and humidity. Compositions according to the present invention can be crosslinked relatively rapidly under ambient conditions. For example, in an embodiment of the present invention, a copolymer of ethylene and an unsaturated silane having hydrolysable groups can be crosslinked under ambient conditions of temperature, pressure and humidity within 48 hours of extrusion. The need to expose the silyl polymer to water or steam at elevated temperature can therefore be eliminated or at least reduced.

Thus, according to the present invention, a composition capable of being crosslinkable by the action of water comprises
(A) a silyl polymer,
(B) an ester of a linear dibasic acid having from 4 to 14 carbon atoms and a branched alcohol having from 4 to 14 carbon atoms and,
(C) an organometallic silanol condensation catalyst.

The silyl polymer employed in the composition of the present invention is suitably any organic polymer containing hydrolysable silane groups which is crosslinkable by the action of water in the presence of a silanol condensation catalyst. In particular, the silyl polymer can substantially comprise polymerised olefin units. Preferably the silyl polymer is an ethylene polymer containing hydrolysable silane groups. Such ethylene polymers can comprise up to 30% by weight of monomer units other than silane units. Preferably however, the ethylene polymer comprise less than 10% by weight of such other monomers. Most preferably, the silyl polymer is a copolymer of ethylene units and silane units only. Examples of suitable silyl polymers and references to their methods of manufacture are described above. Preferred silyl polymers are those prepared by copolymerising ethylene and an unsaturated silane compound having one or more hydrolysable groups preferably in the presence of a free radical initiator and optionally together with one or more other monomers copolymerisable therewith, or those prepared by graft copolymerising an unsaturated silane or to a base polymer in the presence of a grafting initiator. Particularly preferred silyl polymers are those prepared by copolymerising ethylene and an unsaturated silane compound having one or more hydrolysable groups, optionally together with one or more other unsaturated compounds, at a temperature of 150° to 400° C. and a pressure of 1000 to 4000 bar (100 to 400 MPa) in the presence of a free radical polymerisation initiator.

The unsaturated silane compound employed in such processes is preferably a compound having the general formula $XSiX^1{}_nY_{3-n}$ wherein X represents an ethylenically unsaturated hydrocarbyl or hydrocarbyloxy group; $X^1$ represents an aliphatic saturated hydrocarbyl group; Y represents a hydrolysable organic group; and n represents zero, 1 or 2. X can be, for example, vinyl, allyl, isopropenyl, butenyl, cyclohexenyl or gamma-methacryloxypropyl. Y can be, for example, methoxy, ethoxy, formyloxy, acetoxy, propionyloxy, alkylamino or arylamino. $X^1$ can be, for example, methyl, ethyl, propyl, hexyl, octyl, decyl or phenyl. X is preferably a vinyl group, Y is preferably methoxy, ethoxy or acetoxy. Preferred unsaturated silane compounds are vinyl trimethoxy silane, vinyl triethoxy silane and vinyl triacetoxy silane.

The silyl polymer suitably contains 0.1–10 weight %, preferably 0.5 to 5 weight %, more preferably 0.7 to 2 weight % of copolymerised or grafted units of the unsaturated silane compound (based on silyl polymer).

The ester of a linear dibasic acid and a branched alcohol can be a single ester or a mixture of such esters. Examples of dibasic acids which could be used alone or in combination to form the ester of the present invention are pinelic acid, suberic acid, malonic acid, glutaric acid and adipic acid. Examples of branched alcohols which could be used alone or in combination to form the ester of the present invention are 2-pentanol, 2-ethyl pentanol, 2-propanol, 2-ethyl hexanol, 2-octanol, 2-ethyl octanol, 2-propyl octanol, 2-butenyl octanol and 2-pentyl octanol.

The ester preferably has a boiling point at 500 Pa of at least 200° C., more preferably at least 220° C. Preferably it is a liquid at or below 20° C. The viscosity of the ester is preferably less than 300 mPa.s at 20° C. and less than 15 mPa.s at 100° C.

A specific example of an ester suitable for use in the invention is di(2-ethyl-hexyl)adipate which is commercially available e.g. from BP Chemicals as Bisoflex DOA (BISOFLEX is a trade mark).

The molar ratio of the quantities of ester to silanol condensation catalyst is suitably in the range 10:1 to 1:3, preferably in the range of 6:1 to 1:2, more preferably 6:1 to 3:1.

Particular combinations of the ester with other components which form useful "precursors" to the composition of the present invention can comprise, for example;
1. A masterbatch comprising the ester and a suitable polymeric carrier, for example low density polyethylene.
2. A masterbatch comprising the ester, the silanol condensation catalyst and a suitable polymeric carrier, for example low density polyethylene. Such masterbatch may optionally contain other ingredients, for example antioxidant or process stabilisers and the like.
3. A blend of the ester with a hydrolysable unsaturated silane compound, a peroxide grafting initiator and a silanol condensation catalyst.

The precursor (1) can suitably be used by blending the precursor with a masterbatch of a silanol condensation catalyst and a silyl polymer, such as an ethylene/unsaturated silane copolymer or a graft polymer of polyethylene with an unsaturated silane, to produce a composition according to the present invention.

This blending can be done before or during melt processing to form an article. Similarly, precursor (2) can be blended with a silyl polymer, such as an ethylene/unsaturated silane copolymer or a graft copolymer of polyethylene with an unsaturated silane to produce a composition according to the present invention. This blending can be done before or during melt processing to form an article. The precursor (3) can be used, for example, for the direct production of crosslinkable articles based on graft polymer of polyethylene with unsaturated silane using for example extrusion apparatus of the type described in GB-A-1526398 (BICC Limited and Establishments Maillefer SA).

Any of the organometallic silanol condensation catalysts known in the art for crosslinking silyl polymers can be suitably employed in the present invention. They can be used in the quantities conventionally employed. Examples of suitable classes of organometallic silanol condensation catalysts are, for example complexes or carboxylates of lead, cobalt, iron, nickel, zinc and tin. Specific examples of the silanol condensation catalyst are dibutyl tin dilaurate, dibutyl tin diacetate, dibutyl tin dioctoate, stannous acetate, stannous caprylate, lead naphthenate, zinc caprylate, cobalt naphthenate; carboxylates of tin are preferred. Particularly preferred silanol condensation catalysts are dialkyl tin carboxylates, for example dibutyl tin dilaurate, dibutyl tin dipalmitate, dibutyl tin distearate, dioctyl tin dilaurate and dibutyl tin maleate.

The quantity of silanol condensation catalyst employed in the crosslinkable composition of the present invention is suitably in the range 0.0001 to 0.5 moles, preferably in the range 0.0005 to 0.05 moles per mole of hydrolysable silyl units in the silyl polymer.

Generally speaking, the quantity of the silanol condensation catalyst is in the range from 0.01 to 5% by weight, most preferably 0.03 to 0.2% by weight, relative to the quantity of silyl polymer in the composition.

The composition of the present invention comprising the silyl polymer, the ester and the silanol condensation catalyst and/or any other ingredients of the composition, can be prepared by a variety of techniques including, for example, direct blending or compounding of the ingredients, the use of masterbatch techniques or by forming the silyl polymer by grafting techniques "in situ" in the presence of the ester or by direct injection of a mixture comprising the ester and the silanol condensation catalyst separately or as a mixture into the silyl polymer melt.

The present invention includes a process for preparing a composition capable of being crosslinked by the action of water comprising blending together:
(A) a silyl polymer
(B) an ester of a linear dibasic acid having from 4 to 14 carbon atoms and a branched alcohol having from 4 to 14 carbon atoms, and
(C) an organometallic silanol condensation catalyst.

The invention also includes a process for preparing a composition capable of being crosslinked by the action of water comprising blending together:
(A) components which when reacted together form a silyl polymer
(B) an ester of a linear dibasic acid having from 4 to 14 carbon atoms and a branched alcohol having from 4 to 14 carbon atoms, and
(C) an organometallic silanol condensation catalyst
and subjecting the blend to conditions such that the components (A) react to form a silyl polymer. The components which when reacted together form a silyl polymer can be, for example, a polymer, such as polyethylene, an unsaturated silane compound having one or more hydrolysable groups and a grafting initiator which when reacted together form a graft copolymer.

The composition can be prepared for example by contacting the silyl polymer in granular form (e.g. powder or pellets) with the ester and organometallic silanol condensation catalyst under conditions such that the ester and silanol condensation catalyst are absorbed by the polymer granules. If desired, other additives, for example antioxidant can be absorbed into the polymer using the same type of "soaking" technique. Thus, if desired, the granular polymer can be tumbled with a mixture of ester, silanol condensation catalyst and antioxidant until absorption of the ingredients is substantially complete. The rate of absorption can be increased by the use of elevated temperatures and/or intensive mixing if desired. Optionally, an absorbent filler such as, for example, chalk, silica or talc, can be employed to assist absorption of the catalyst and ester into the composition.

In a further method of making the composition of the present invention, the ester and the silanol condensation catalyst and optionally any other ingredients which it is desired to incorporate in the composition, can be included in a masterbatch, prior to compounding the masterbatch with the silyl polymer or with components which react together to form the silyl polymer "in situ".

In the case that the silyl polymer is prepared by grafting the unsaturated silane on to a base polymer, for example low density polyethylene, linear low density polyethylene, ethylene/ethyl acrylate copolymer or ethylene/vinyl acetate copolymer, the ester and/or the silanol condensation catalyst can for example be incorporated into the base polymer prior to or during the performance of the grafting reaction.

A crosslinkable composition according to the present invention comprising the silyl polymer, the ester, the silanol condensation catalyst and, optionally other ingredients, can for example be prepared directly is the form of crosslinkable finished articles by extruding a base polymer, e.g. polyethylene, together with the ester, an unsaturated silane compound of the type described earlier in this specification, a free radical catalyst, i.e. initiator for grafting (e.g. an organic peroxide) and a silanol condensation catalyst. This method can be applied for example in the well-known MONOSIL (RTM) process for the production of insulated wire and cable.

The composition of the present invention can contain additives conventionally employed in the art. Examples of such additives are antioxidants, fillers, metal deactivators (e.g. salicylaldehyde oxime or a hydrazine), lubricants, water-tree inhibitors, forming agents, flame retardants and pigments. Additives of this type are conventionally incorporated into the composition either directly or by a masterbatching technique.

The composition can also be blended with other compatible polymeric materials, for example, polyethylene, polypropylene, ethylene/ethyl acrylate copolymer and ethylene/1-olefin copolymer (e.g. LLDPE).

The composition of the present invention can be used to manufacture crosslinked products using the technology known in the manufacture of articles from conventional silyl polymers. For example, the composition can be used in blow-moulding, injection-moulding, film-blowing, calendering, extrusion, roto-moulding and extrusion-coating techniques. The composition is particularly preferred for wire and cable coating applications. Wire and cable insulation produced by extrusion coating using the composition of the present invention exhibits more rapid crosslinking under ambient conditions of pressure, temperature and humidity.

It has been found that the best results are obtained when the compositions are fabricated into articles relatively soon after their preparation. In particular the compositions according to the present invention should preferably be used relatively soon after the ester and silanol condensation catalyst are combined together. Preferably, the compositions according to the present invention are used to fabricate articles within about two days, and more preferably within 24 hours of the ester and the silanol condensation catalyst being brought into contact with each other.

The present invention includes the use of an ester of a linear dibasic acid having from 4 to 14 carbon atoms and a branched alcohol having from 4 to 14 carbon atoms to increase the rate of crosslinking of a composition comprising a silyl polymer and an organometallic silanol condensation catalyst.

Articles fabricated from the composition of the present invention can be readily crosslinked by exposure to water in the form of liquid, steam or moist air.

The invention is illustrated by the following Examples and Comparative Tests.

EXAMPLES 1 to 3 and COMPARATIVE TESTS A to E

Dibutyl tin dilaurate and di(2-ethyl-hexyl) adipate were mixed together in different amounts to provide a series of mixture with different molar ratios. The moisture content of each mixture was determined using a Mitsubishi CA-02 moisture meter. The mixtures were then sealed in air-tight vials to prevent further absorption of atmospheric water. The ester was a commercial product sold by BP Chemicals Limited under the trade designation Bisoflex DOA and had a boiling point at 500 Pa of 236° C. and a viscosity at 20° C. of 13 mPA.s and at 100° C. of 2.2 mPa.s.

Within twenty four hours of preparation, the mixtures were added to 100 g samples of a silane copolymer in sufficient quantity that each of the crosslinkable silyl polymer compositions containing 0.1 parts by weight of the silanol condensation catalyst per one hundred parts by weight of the silane copolymer. The silane copolymer was a copolymer of ethylene and vinyl trimethoxy-silane containing 1.5 weight % of copolymerised units of the vinyl trimethoxy silane. Each of the crosslinkable compositions was thoroughly mixed in a stoppered flask using a Microid flask shaker and was then extruded using an 18:1, 1.0 inch (25.4 mm) Brabender extruder fitted with a standard 3:1 compression ratio "polyethylene" screw and 0.25 inch (1.016 mm) rod die. The barrel temperatures of the extruder were set to 140° C., 160° C. and 180° C. from hopper to die. The die itself was maintained at 220° C. The screw speed was 30 rpm, giving a residence time of approximately 3.5 minutes. The extrudate was rapidly cooled by having cold air blown over it. A haul off unit was used to maintain a substantially constant diameter rod the extruder was flushed with an additive-free low density polyethylene until no gels were observed in the extrudate. The low density polyethylene had a melt flow index of 0.9 dg/min and a density of 926 kg/m$^3$.

Forty-eight hours after extruding the crosslinkable silyl polymer compositions, samples were analysed for gel content. The gel content was determined using a test method based on ASTM D 2765 using xylene mixed isomers with a boiling point of 140° C. This provided a measure of the amount of crosslinking which had occurred both during the extrusion and the following 48 hours; as such it can be taken as an indication of the tendency of the composition to undergo curing under ambient conditions, i.e. atmospheric pressure, approximately 20° C. and a relative humidity from 60 to 75%.

On the basis of a tactile assessment of the surface of the extrudate of each crosslinkable composition, a representative sample having average roughness was chosen and subjected to a measurement of the surface roughness using a Takysurf 4 measuring device sold by Rank Taylor Hobson (Talysurf is a trade mark). The design of the Talysurf 4 is based on well tried and proved principles and conforms to British Standard 1134:1961. The Talysurf instrument makes use of a sharply pointed stylus to trace the profile of surface irregularities. A flat shoe ar skid provides a datum. The pick-up carrying the stylus and shoe or skid was traversed across the surface of the extrudate for a horizontal distance of 90 mm. Using a transducer the up and down movements of the stylus relative to the shoe or skid were converted into corresponding changes in electric voltage which were amplified and used to control a graph recorder which provided a graphical representation of the profile of the surface of the extrudate. A computer was used to calculate the surface roughness value which is the length of the graphical representation of the profile, in microns, divided by the horizontal length, in millimeters, of the surface traversed by the stylus, i.e. 90 mm.

The surface roughness value and gel content for each of the extruded crosslinkable silyl polymer compositions is given in Table 1.

For comparison, the results are also given for the silane copolymer alone (Comparative Test A), for the silane copolymer with 0.1% by weight of dibutyl tin dilaurate but without ester (Comparative Test B) and for the silane copolymer with different molar ratios of a different adipate ester which was based on (a) adipic acid and (b) predominantly linear alcohols having an average of eight carbon atoms which ester is sold by BP Chemicals Limited under the trade designation BISO-FLEX DL79A (Comparative Tests C, D and E). Extrusion experiments were carried out in duplicate and the gel content results for both are reported in the Table.

The gel contents after 48 hours of the compositions according to the present invention were more than 2.5 times more than those of Comparative Tests C to E which contained a different adipate ester and more than twice the gel content of Comparative Test B which contained no adipate ester. The compositions according to the present invention had a surface roughness value which was at least as good as the composition containing the dibutyl tin dilauratesilanol condensation catalyst but no adipate ester (Comparative Test B).

TABLE 1

| Example or Comparative Test | Molar Ratio of Dibutyl Tin Dilaurate to Aromatic Ester | Moisture Content of Mixture of Dibutyl Tin Dilaurate and Aromatic Ester (ppm) | Gel Content after 48 hours (%) | Surface Roughness |
| --- | --- | --- | --- | --- |
| A | — | — | 0.2 | 9.26 |
| B | — | 1000 | 31.8/36.1 | 45.14 |
| C | 1:2 | 1600 | 31.3/30.6 | 32.14 |
| D | 1:4 | 1600 | 25.9/28.0 | 29.44 |
| E | 1:6 | 1600 | 28.0/27.3 | 30.31 |
| 1 | 1:2 | 1200 | 77.3/77.6 | 40.31 |
| 2 | 1:4 | 1000 | 73.1/71.0 | 37.76 |
| 3 | 1:6 | 900 | 75.1/75.4 | 45.42 |

I claim:

1. A composition capable of being crosslinked by the action of water which comprises;
   (A) a silyl polymer which is an ethylene polymer containing hydrolyzable silane groups
   (B) an ester of a linear dibasic acid having from 4 to 14 carbon atoms and a branched alcohol having from 4 to 14 carbon atoms and,
   (C) an organometallic silanol condensation catalyst.

2. A composition as claimed in claim 1 in which the silyl polymer is a polymer prepared by copolymerising ethylene and an unsaturated silane compound having one or more hydrolysable groups, at a temperature of 150° to 400° C. and a pressure of 1000 to 4000 bar (100 to 400 MPa) in the presence of a free radical polymerisation initiator.

3. A composition as claimed in claim 1 in which the ester is an ester of a dibasic acid selected from the group comprising pinelic acid, suberic acid, malonic acid, glutaric acid and adipic acid.

4. A composition as claimed in claim 1 in which the branched alcohol used to form the ester is selected from the group comprising 2-pentanol, 2-ethyl pentanol, 2-ethyl hexanol, 2-octanol, 2-ethyl octanol, 2-propyl octanol, 2-butenyl octanol and 2-pentyl octanol.

5. A composition as claimed in claim 1 in which the ester is di(2-ethyl-hexyl) adipate.

6. A composition as claimed in claim 1 in which the molar ratio of the quantity of ester to silanol condensation catalyst is in the range 10:1 to 1:3.

7. A composition capable of being crosslinked by the action of water which comprises:
   (A) a copolymer of ethylene and an unsaturated silane selected from the group consisting of vinyl trimethoxysilane, vinyl triethoxy silane and vinyl triacetoxy silane.
   (B) di(2-ethyl-hexyl) adipate, and
   (C) an organometallic silanol condensation catalyst.

8. A process for preparing a composition capable of being crosslinked by the action of water comprising blending together;
   (A) a silyl polymer which is an ethylene polymer containing hydrolyzable silane groups
   (B) an ester of a linear dibasic acid having from 4 to 14 carbon atoms and a branched alcohol having from 4 to 14 carbon atoms, and
   (C) an organometallic silanol condensation catalyst.

* * * * *

UNITED STATES PATENT AND TRADEMARK OFFICE
CERTIFICATE OF CORRECTION

PATENT NO. : 5,025,071
DATED : June 18, 1991
INVENTOR(S) : David J. Bulles It is certified that error appears in the above-identified patent and that said Letters Patent is hereby corrected as shown below:

Col. 1, l. 40, the word "preferred" should read --preformed--.

Col. 2, l. 13-14, remove comma (,) after "alkylacrylate"

Col. 3, l. 34, the word "crosslinkable" should read --crosslinked--

Col. 3, l. 62, change "or" to --on--

Col. 5, l. 13, the word "Establishments" should read --Etablissements--

Col. 6, l. 41, change "is" to --in--.

Signed and Sealed this

Fifteenth Day of December, 1992

*Attest:*

DOUGLAS B. COMER

*Attesting Officer*  *Acting Commissioner of Patents and Trademarks*